United States Patent Office 2,782,231
Patented Feb. 19, 1957

2,782,231

PREPARATION OF MALONANILIC ACID AND SUBSTITUTED MALONANILIC ACIDS

Bryan C. Redmon, Baltimore, Md., assignor to National Distillers Products Corporation, New York, N. Y., a corporation of Virginia No Drawing. Application December 17, 1952, Serial No. 326,577

6 Claims. (Cl. 260—518)

This invention relates to the manufacture of malonanilic acid, and substituted malonanilic acids, and provides an improved process whereby these acids may readily be produced in very good yields.

These compounds are of particular value in the preparation of malonic esters and substituted malonic esters which are widely used in organic syntheses, for example, in the manufacture of barbiturate drugs, such as phenobarbital. The process of the invention is especially valuable in that it affords a simple and economic way of preparing malonic acid having various organic radicals in place of one or both of the methylene hydrogen atoms. This is particularly true in the case of substituted phenyl groups, since it is impossible to introduce these by resort to the well-known process of treating sodio-malonic ester with an aryl halide. By the use of the substituted malonanilic acids produced in accordance with my present invention, one may prepare a mono-substituted malonic derivative free from the analogous di-substituted compounds, which is a distinct advantage over the usual methods of substituting groups on the methylene carbon atom of malonic acid derivatives.

It has previously been proposed to prepare malonanilic acid by a process involving the reaction of carbon dioxide with the dry, solid, sodium derivative of acetanilide, but that proposed procedure has not proven satisfactory because of its very low yield of the desired product.

I have now discovered that surprisingly high yields of malonanilic acid, or substituted malonanilic acids may be produced by reacting carbon dioxide with the alkali metal derivative of acetanilide, or substituted acetanilides in anhydrous suspension in certain inert liquid vehicles, while maintaining the temperature of the suspension within the range of 20° C. to 100° C. and separating and acidifying the resultant alkali metal malonanilate.

Predicated upon this discovery, the process of my invention comprises suspending an alkali metal derivative of acetanilide, or substituted acetanilide in a suitable inert liquid vehicle, for instanace, toluene, and reacting carbon dioxide with the suspension under substantially anhydrous conditions, while maintaining the temperature within the range just indicated, and thereafter separating and acidifying the resultant alkali metal malonanilate to produce the malonanilic or substituted malonanilic acid.

The invention is applicable generally to the production of acids of the generic formula

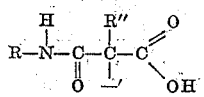

in which R represents a phenyl or a substituted phenyl radical, R' represents hydrogen or an aliphatic, a cycloaliphatic, or an aromatic radical and R" represents hydrogen or an aliphatic, a cycloaliphatic or an aromatic radical. The particular product produced will depend upon the acetanilide reactant selected for use in the process, the latter being of the formula

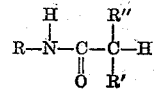

R, R' and R" having the meaning above indicated for the final product and remaining unchanged by the process.

The suspension of the acetanilide reactant may, with advantage, be prepared by dissolving the acetanilide, or a selected substituted acetanilide, in an aromatic hydrocarbon, such as toluene, adjusting the temperature of the solution to around 100° C. and adding metallic sodium. In place of sodium, other alkali metal may be used. An alternative procedure is to add sodium alcoholate, for instance, sodium ethylate, in place of metallic sodium, in the latter instance, care being taken to distill off all of the alcohol of reaction before proceeding with the carboxylating step. When certain substituted acetanilides are used, containing substituents which may react with the metallic sodium, such, for instance, as the chlorine atom of orthochloroacetanilide, the alcoholate is preferred in place of metallic sodium. In each case, the reaction is mol for mol and gaseous hydrogen is liberated. These methods of preparing alkali metal derivatives of acetanilide and substituted acetanilide are well known to the art.

The liquid vehicle in which the carboxylation of the acetanilide derivative is effected should be anhydrous and inert with respect to the reactants. For this purpose, I have, with particular advantage, used toluene, xylene, dibutyl ether, or dimethyl aniline. Other similar inert liquid hydrocarbon vehicles, for instance, hexane, may be employed, but for most favorable yields, those just mentioned are especially recommended.

As previously noted, the temperature at which the carboxylation is effected may vary over a considerable range but operating temperatures around 50° C. may be used with particular advantage.

During the carboxylation, the suspension should be thoroughly agitated. Gaseous carbon dioxide may be supplied to the reaction vessel at a pressure within the range extending from about atmospheric pressure to 900 pounds per square inch gauge until no further substantial absorption of the carbon dioxide results. The carbon dioxide is absorbed in the suspension in substantially stoichiometric amounts, that is, for instance, one mol of carbon dioxide per atom of sodium. Though the carbon dioxide gas may be supplied at pressures in the upper end of the indicated range, the results at these higher pressures are not substantially different from that at atmospheric pressure.

The carbon dioxide gas may, if desired, be bubbled into the reaction slurry, but it is usually preferred to introduce the gas into the reaction vessel at a point above the surface of the suspension so as to avoid plugging of the gas inlet tube by precipitated solids.

In order to obtain maximum yields, I have found it advantageous to maintain the $CO_2$ saturated suspension under an atmosphere of carbon dioxide gas for from 1 to 24 hours at a temperature within the range from room temperature to 100° C. and especially at a temperature of 90° to 100° C. for about five hours. At lower temperatures, the holding time should be extended. For instance, at 50° C., a holding time of 16 hours has been found advantageous. It is desirable to continue the agitation during the holding period just mentioned.

Following this carboxylation period, the mass is cooled to room temperature and water is added with stirring. The mixture, consisting of an upper oil layer, a lower water layer and a solid which is composed of a part of the anilide, or substituted anilide, which was chosen for the reaction with the sodium, is filtered to remove the solid and the clear two-layered filtrate separated. The aqueous layer is then acidified by the addition of an acid, for instance, hydrochloric acid, or sulfuric acid, to a pH of about 1, for converting the sodium salt to the malonanilic acid which is precipitated from the solution in crystalline form, is separated, as by filtration, and then dried. It is usually desirable where the acid so formed is relatively water soluble for instance, unsubstituted malonanilic acid, to salt-out a further crop of crystalline acid from the mother liquor, for instance, by saturating the mother liquor with sodium chloride.

The materal from which the water layer, just noted, is separated, is composed of the inert vehicle and a solid precipitate of the anilide used as mentioned above or substituted acetanilide which was chosen for reaction with the sodium. The inert liquid layer usually contains, in solution, a small amount of side reaction products which may readily be converted to aniline and recovered therefrom by extraction with dilute hydrochloric acid followed by treatment with caustic soda and distillation of the resultant aqueous extract layer by well-known procedure. The separated inert liquid may then be dried and reused in the process. The solid precipitate of the original anilide may be dried and recycled in the step involving the reaction with sodium.

The yields of malonanilic acid, or substituted malonanilic acid, obtained by my process have been found to vary somewhat with the particular acetanilide reactant used and also with the particular inert vehicle employed in the carboxylation step of the process.

For instance, using toluene as the inert liquid and the sodium salt of a reactant of the formula previously noted herein, in which R is the orthochlorophenyl radical and R' and R" were both hydrogen, the yield of orthochloromalonanilic acid, based on the amount of sodium consumed, was 4.6%; where R was the phenyl radical and both R' and R" were methyl radicals, the yield was 4.99%; where either R' or R" was an aliphatic or cycloaliphatic radical, the other being hydrogen, a yield of 30-38% was obtained; where R' and R" were both hydrogen, other conditions being unchanged, a yield of around 30-38% is also obtained, and where either R' or R" was a phenyl radical, the other being hydrogen, a yield of around 65% was obtained. In practically all of the instances, just noted, recovery of unreacted acetanilide, or substituted acetanilide was feasible and based on the amount of that reactant consumed, yields of around 90% or better were obtained.

Variations in yield, depending upon the particular inert liquid vehicle used in the carboxylation step, are illustrated by a series of tests in each of which the sodium derivative of acetanilide was used, other conditions being comparable except for variation in the particular inert vehicle employed. Where hexane was used as the inert vehicle, the yield of malonanilic acid, based on the sodium consumed, was 7.8%. Where the inert material used was isobutyl ether, the yield on the same basis was 26% and where the inert vehicle was dimethyl aniline, a yield of 25.7% was obtained.

The process of my invention will be further illustrated by the following specific examples:

Example I 2255.0 grams of phenylacetanilide was dissolved in 11.5 liters of toluene in a flask equipped with an agitator, external heater, and a condenser adapted for either refluxing or distillation. About 1.5 liters of toluene was first distilled from the flask to remove all traces of water and the solution was then cooled to about 100° C. and 230 grams of clean sodium metal added over a period of 30 minutes. The mixture was refluxed for six hours at a temperature of about 110° C. with thorough stirring and with evolution of hydrogen gas.

The mixture thus reacted was then cooled to about 49° C. and a stream of carbon dioxide gas was introduced to the flask above the surface of the resulting slurry while stirring, the temperature not being allowed to exceed 51° C. during the carboxylation. The initial absorption of $CO_2$ was rapid and slightly exothermic. At the end of eight hours, noticeable evolution of heat had ceased. The carbon dioxide absorbed during this period was equivalent to about .90 mol per mol of sodium phenylacetanilide. For the next 16 hours the batch was stirred and held at 50° C. under an atmosphere of carbon dioxide.

The mixture was then cooled to about 33° C., 5 liters of ice water was added and the mass agitated for 1 hour. A mixture of solid unreacted phenylacetanilide, a hydrocarbon liquid phase, and an aqueous phase resulted.

The solid phenylacetanilide was separated by filtration and the filtrate layers were settled and the aqueous phase and hydrocarbon phase separated. The aqeuous layer was acidified with 1800 ml. of 6 N sulfuric acid, added slowly with stirring. Phenylmalonanilic acid was precipitated as a white, finely-divided, crystalline solid. It was removed by filtration, washed with water and dried at 70° C., yielding 1742 grams of phenylmalonanilic acid, melting with decomposition at 124-126° C. Titration with standard alkali indicated a purity of 94.6%. This represents a yield of 64.6% based on the sodium used.

A total of 685 grams of phenylacetanilide was recovered by means of the first filtration and by concentration of the toluene layer of that filtrate. On the basis of phenylacetanilide consumed the yield of phenylmalonanilic acid was 89%.

The concentrated toluene filtrate was further extracted with dilute hydrochloric acid and 40 grams of aniline was obtained by caustic treatment and distillation of the aqueous layer obtained. This aniline is the equivalent of 90.7 grams of phenylacetanilide.

Example II 405 grams of acetanilide was dissolved in 3.5 liters of toluene in a flask, such as described in Example I. About 0.5 liter of toluene was first distilled from the flask to remove all traces of water. After the resultant solution was cooled to about 100° C., 69 grams of clean sodium metal was added over a period of 30 minutes. The mixture was refluxed for about six hours at about 110° C. with thorough stirring, hydrogen gas being evolved. The mixture thus reacted was then cooled to about 20° C. and a stream of carbon dioxide gas was introduced over the surface of the resultant slurry while stirring, the temperature not being allowed to rise above 60° C. At the end of 5 hours a gain in weight of 122.5 grams was noted, this being about 91.0% of the theoretical absorptive capacity of the sodium acetanilide for $CO_2$. The temperature was then raised to about 90-100° C. and held there four hours while the mixture was agitated in an atmosphere of $CO_2$.

At the end of this period the mixture was cooled to about 25° C. and 1 liter of water was added and the whole stirred for 2 hours. A precipitate of acetanilide resulted and was separated by filtration. The cake so obtained was slurried with about 250 ml. of water, refiltered, and the water added to the previous filtrate.

The total filtrate and washings were separated by settling into a hydrocarbon and an aqueous layer. The aqueous layer was acidified with concentrated hydrochloric acid, added with stirring until a pH of 1 resulted. Malonanilic acid precipitated as light tan crystals. These were filtered and washed with 300 ml. of water. A second crop of malonanilic acid crystals was salted out from the filtrate of the first crop by saturating the solution with sodium chloride. This crop was filtered, washed, combined with the first crop of crystals, and the batch was dried at room temperature. A total of 172 grams of malonanilic acid, melting with decomposition at 128–130° C. was obtained. The purity of this product, as ascertained by titration with standard sodium hydroxide, was about 95%.

The malonanilic acid yield on the basis of the sodium used was 30.4%. Unconverted acetanilide recovered by the original filtration amounted to 252.0 grams and that recovered by concentration of the toluene layer of the filtrate amounted to 23 grams, making a total recovery of 275 grams. This malonanilic acid yield, on the basis of acetanilide consumed, was 94.1%.

*Example III*

When this process was carried out in the manner of Example II, except that the carboxylation was accomplished under a pressure of 800–900 pounds per square inch gauge of carbon dioxide, malonanilic acid was isolated in approximately the same yields.

*Example IV*

The process was carried out, as in Example II, except that the addition of $CO_2$ was at 25° C. and the mixture was allowed to stand overnight at room temperature, the mass being blanketed by $CO_2$. The product was isolated by the procedure used in Example II and crude malonanilic acid was obtained in a 13% yield, on the basis of the sodium used.

*Example V*

Sodium acetanilide was prepared in toluene as in Example II, filtered off in an atmosphere of nitrogen, then dispersed in dibutyl ether. This suspension was carboxylated and the product isolated as in Example II. A malonanilic acid yield of 26%, based on the sodium used, was obtained.

*Example VI*

The procedure used was similar to that of Example V, except that a reaction medium of hexane was employed. A malonanilic acid yield of 7.8% was obtained, on the basis of the sodium used.

*Example VII*

The procedure used was similar to that of Example V, except that a reaction medium of dimethyl aniline was employed. A malonanilic acid yield of 25.7% was obtained, on the basis of the sodium used.

*Example VIII*

74.5 grams of propionanilide were dissolved in 825 ml. of toluene in a flask such as described in Example I. About 75 ml. of toluene was first distilled from the flask to insure the complete removal of traces of water. After the resultant solution was cooled to about 100° C., 27 grams of solid sodium methylate was added. The mixture was refluxed for six hours with thorough stirring, and thereafter the methanol was completely removed by distillation.

The mixture was then cooled to about 50° C. and a stream of carbon dioxide gas was passed over the surface of the resultant slurry, while stirring, the rate of admission of the $CO_2$ being controlled so that the temperature did not rise above 60° C. Then, with carbon dioxide still blanketing the mixture, the temperature was raised to 80–100° C. and held for 4 hours.

The product, methyl malonanilic acid, was isolated by the procedure employed in Example II. 32.6 grams was obtained, representing a yield of 33.8% on the basis of the sodium consumed. The product melted at 163–165° C., with decomposition. 2.4813 grams of the product required 25.50 ml. of ½ N NaOH to neutralize it to phenophthalein indicator. The equivalent weight thus found was 194.6 as compared to the calculated value of 193.

*Example IX*

81.5 grams of n-butyranilide was dissolved in 1300 ml. of toluene in a flask such as described in Example I. About 100 ml. of toluene was first distilled from the flask to insure the complete removal of traces of water. The resultant solution was then cooled to about 100° C. and 27 grams of sodium methylate was added. The mixture was refluxed for six hours with thorough stirring, then the methanol present was completely removed by distillation.

The mixture was then cooled to around 50° C. and a stream of carbon dioxide gas was passed over the slurry for two hours with stirring. The temperature was then raised to 95–96° C. and so maintained for 5 hours in an atmosphere of $CO_2$.

39.2 grams of ethyl malonanilic acid was isolated by the procedure employed in Example II. This represented a yield of 38.1% on the basis of sodium used. The melting point of the product thus isolated was 152–155° C.

*Example X*

108.5 grams of cyclohexylacetanilide was processed as described in Example IX and 49.3 grams of cyclohexyl malonanilic acid was isolated, representing a yield of 37.7% on the basis of the sodium used. The product was shown by analysis to be composed of 68.85% by weight carbon and 7.66% by weight hydrogen, as compared to the calculated percentages of 68.94% and 7.33% respectively.

*Example XI*

81.5 grams of isobutyranilide in 1200 ml. of toluene was processed as described in Example IX, except that the carbonated slurry was maintained from 80–95° C. for 4 hours.

Crude dimethyl malonanilic acid was isolated in the amount of 5.1 grams. This represented a yield of 5.0, based on the sodium used. The product so obtained melted with decomposition at 128–130° C.

*Example XII*

The reaction product of 169.5 grams of orthochloroacetanilide and 57 grams of sodium methylate was processed in a medium of toluene as described in Example VIII. Orthochloromalonanilic acid in the amount of 9.8 grams was obtained, representing a yield of 4.6%, based on the sodium consumed.

I claim:

1. In the process for producing malonanilic acid, and substituted malonanilic acids, which comprises reacting carbon dioxide with an alkali-metal derivative of a compound of the group consisting of acetanilide and substituted acetanilide, the step of effecting the reaction of the carbon dioxide with the acetanilide derivative while the latter is in anhydrous suspension in an inert liquid at a temperature within the range of 20° C. to 100° C. and thereby forming the corresponding malonanilate.

2. The process of claim 1 in which the inert liquid is one selected from the group consisting of toluene, xylene, dibutyl ether and dimethyl aniline and the alkali-metal derivative is that of sodium.

3. In the process for producing malonanilic acid, and substituted malonanilic acids, having the formula

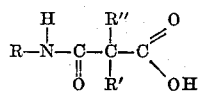

in which R is a radical of the group consisting of phenyl and substituted phenyl radicals and R' and R'' are of the group consisting of hydrogen and aliphatic, cycloaliphatic and aromatic radicals, which comprises reacting carbon dioxide with an alkali-metal derivative of a compound having the formula

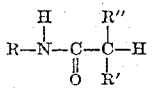

R, R', and R'' having the meaning just noted, the steps of effecting said reaction with the alkali-metal derivative in anhydrous suspension in an inert liquid, while maintaining the temperature of the suspension within the range of 20° to 100° C., separating the resultant sodium salt of malonanilic acid from the reaction mixture and acidifying the salt to form the acid.

4. The process of claim 3 in which the inert liquid is one selected from the group consisting of toluene, xylene, dibutyl ether, and dimethyl aniline, and the alkali-metal derivative is that of sodium.

5. The process of claim 4 in which, following the carboxylation, water is added to the reaction mixture with agitation and the mixture permitted to settle, whereby an aqueous layer and an oil layer containing a solid are formed, the mixture is filtered to remove the solid and the aqueous layer is separated and acidified to convert the resultant sodium salt to the corresponding malonanilic acid.

6. The process of claim 3 in which gaseous carbon dioxide is passed to the suspension until substantial saturation of the suspension with the carbon dioxide is effected and thereafter the suspension is agitated under an atmosphere of carbon dioxide for a period of 1 to 24 hours at a temperature within the range of from room temperature to about 100° C.

References Cited in the file of this patent
UNITED STATES PATENTS

| 2,132,356 | Lecher et al. | Oct. 4, 1938 |
| 2,205,885 | Jackson | June 25, 1940 |
| 2,260,800 | Bush | Oct. 28, 1941 |

OTHER REFERENCES

Seifert: Ber. Deut. Chem., vol. 18, pp. 1358, 1359–1361 (1885).

MacArdle: Solvents in Synthetic Org. Chem. (Van Nostrand), pp. 1–3 (1925).

Evans et al.: J. Am. Chem. Soc., vol. 52, pp. 3645–7 (1930).